March 19, 1929.  H. C. TEUTON  1,705,650
CAMERA
Filed Aug. 21, 1925  2 Sheets-Sheet 2
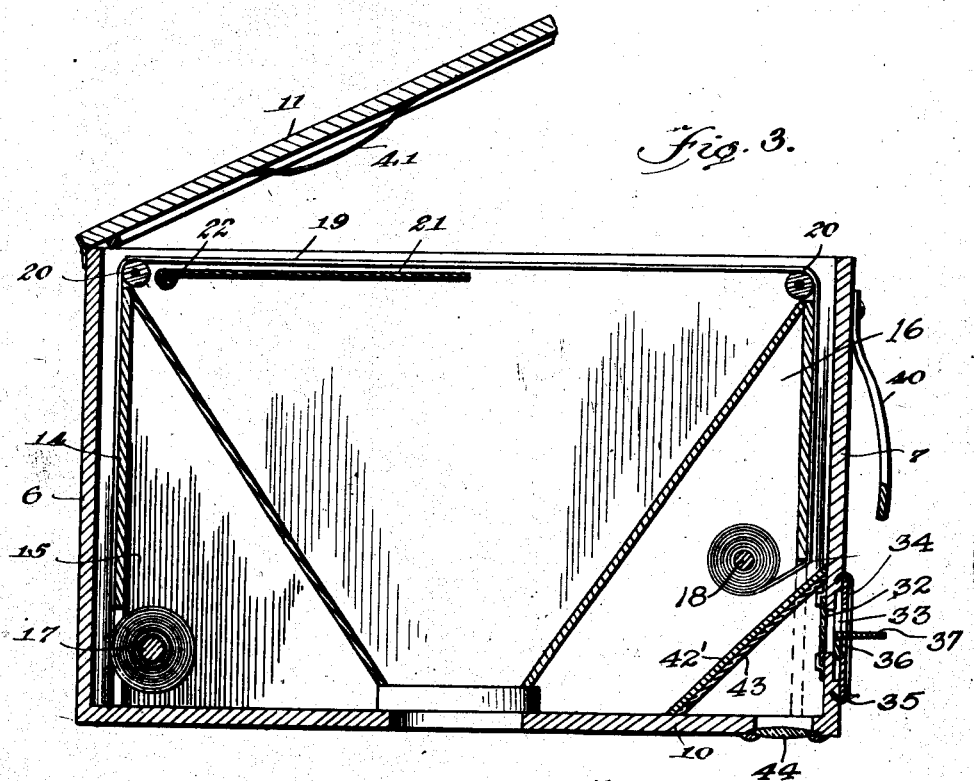
Fig. 3.
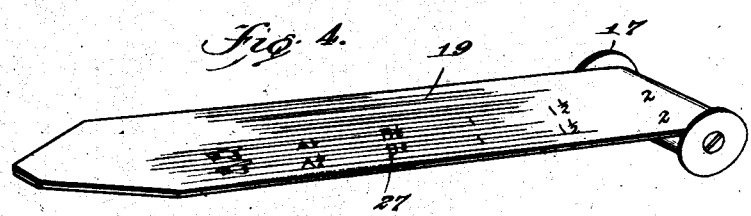
Fig. 4.
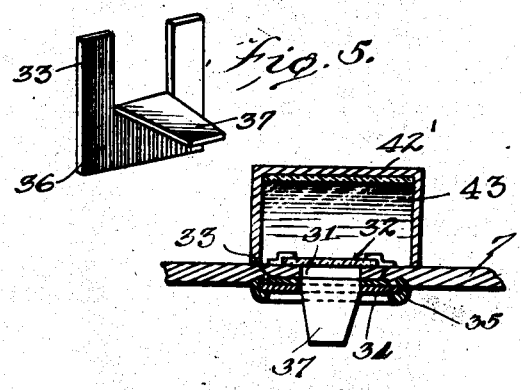
Fig. 5.
Fig. 7.
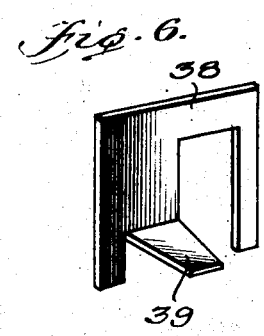
Fig. 6.
INVENTOR
H. C. Teuton,
BY
ATTORNEY Patented Mar. 19, 1929.

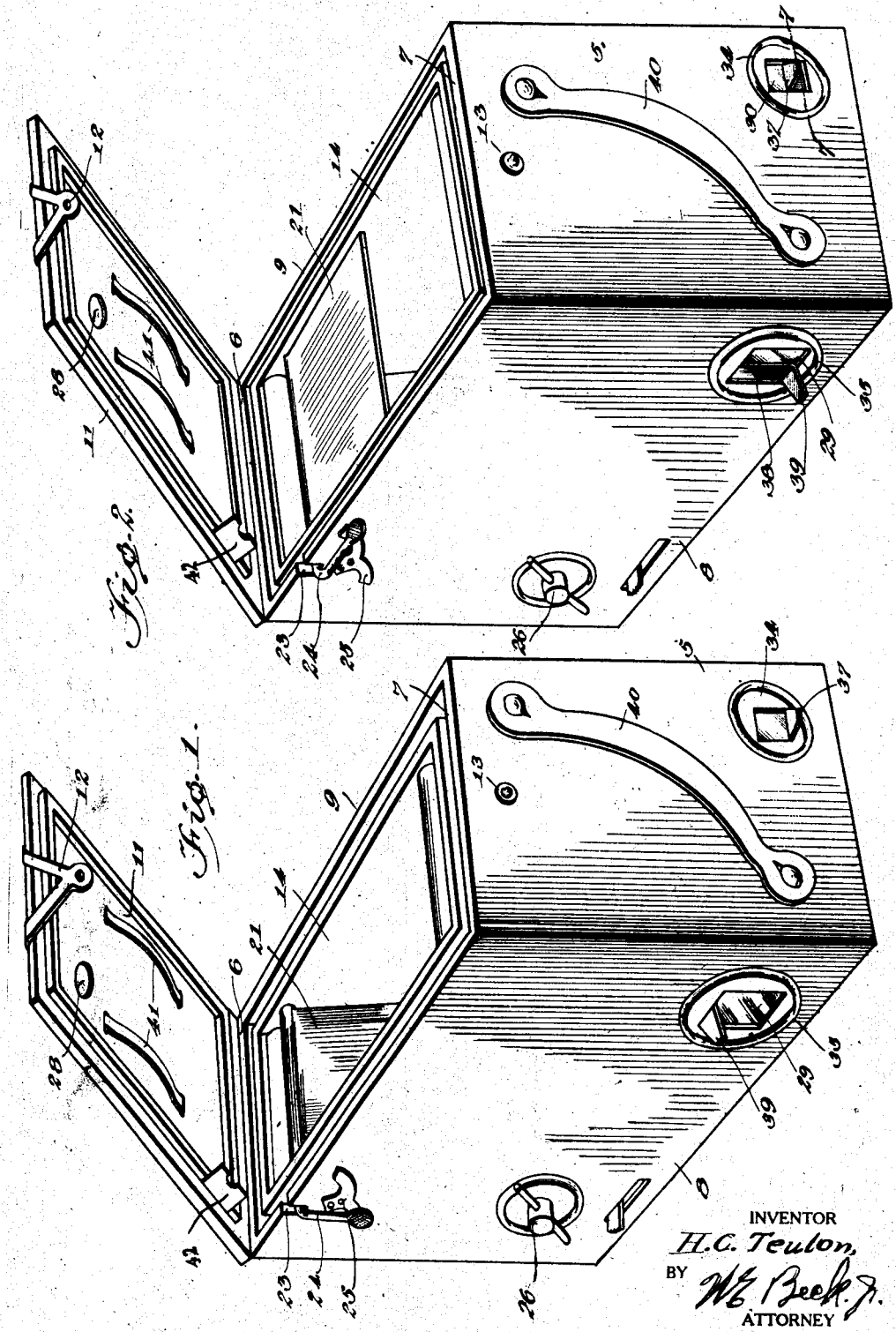

1,705,650

UNITED STATES PATENT OFFICE.

HENRY CLAY TEUTON, OF ADAMSVILLE, TENNESSEE.

CAMERA.

Application filed August 21, 1925. Serial No. 51,638.

My invention relates to improvements in cameras and has for its object to provide an attachment for cameras whereby an exposure may be made on a lesser portion of the film than is usually exposed.

A further object of the invention is to provide adjustable cover means for the finders of the camera, adapted to cover a portion of the finder lens, when an exposure is to be made on a lesser portion of the film, thus, enabling the operator to properly adjust the camera so the view to be photographed will be centered with respect to the exposed portion of the film.

Another object of the invention is to provide an attachment of the above-mentioned character which is simple and durable in construction, capable of attachment to the conventional types of cameras, reliable and efficient in use, and inexpensive to manufacture.

Other objects and advantages of the invention will be apparent during the course of the following description.

In the accompanying drawings, forming a part of this specification and in which like numerals are employed to designate like parts throughout the same, Fig. 1, is a perspective view of a camera with the back open, showing my attachment in an inoperative position, Fig. 2, is a similar view showing the attachment in an operative position, Fig. 3, is a longitudinal sectional view of a camera constructed in accordance with my invention, Fig. 4, is a perspective view of the film roll, showing the indicating marks thereon, Fig. 5, is a perspective view of one of the finder cover plates, Fig. 6, is a similar view of the other finder cover plate, and, Fig. 7 is a cross sectional view taken on lines 7—7 of Fig. 2.

In the drawings, wherein for the purpose of illustration I have shown a preferred embodiment of my invention, the attachment is shown applied to the ordinary box-type camera, but may be used equally as well with cameras of various types.

The camera casing is denoted generally by the numeral 5, having end walls 6 and 7, side walls 8 and 9, a front wall 10 and back wall 11, hingedly connected to the end wall 6. The back is provided with the usual catch 12, adapted to engage the fastener 13, to secure the back in a closed position. Removably mounted within the casing is the usual film supporting frame 14, which adjacent the front of the camera, at the top and bottom, is provided with compartments 15 and 16, to receive the film rollers 17 and 18. The back of the frame is open and the film 19 is trained over the rollers 20, journaled at the rear corners of the frame, so as to extend the full length of the back of the frame. Mounted in the frame 14, adjacent one end of the exposed portion of the film is a shutter 21, which is rigidly connected with the rod 22, journaled in the sides of the frame. One end of the rod extends through the side of the frame and a notch 23, in the side 8 of the casing and has its free extremity bent at right angles to form an actuating handle 24, by means of which the shutter may be moved to and out of operative position. A spring catch 25 is attached to the side 8 of the casing beneath the handle 24 and is adapted to engage the handle to hold the same in its adjusted position. Thus, it is seen that the size of the exposure may be regulated by moving the shutter so as to cover a portion of the film. A shield 42 prevents seepage of light through the slot 23.

A key 26 of the ordinary type is provided for turning the film after an exposure has been made and the film has indicating numerals 27 which are visible through the opening 28 in the back of the casing to indicate to the user when the film has been removed sufficiently to properly position the film for the next exposure.

The camera is also equipped with the usual finders 29 and 30, which are located in the side 8 and end 7, respectively. As shown more clearly in Fig. 7, each of the finders consist of an opening 31 through the casing, covered on its inner side by a ground glass plate 32 and its outer side by a cover plate 33, slidably mounted beneath the washer plate 34, secured in place by the annular ring 35.

The finder apparatus includes the usual construction wherein the image to be photographed is directed through a lens 44 in the side of the camera 10 and is reflected through the finder opening by a mirror 43 angularly mounted therein and maintained within the camera by a frame 42'.

Owing to the difference in the arrangement of the finders the construction of the cover plates vary slightly, being shown more clearly in Figs. 5 and 6. The plate shown in Fig. 5, is adapted for reducing the height of the finder opening and consists of a substantially U-shaped plate 36 having a lug 37 struck up from its intermediate portion to provide finger engaging means for moving the plate. Thus, it is seen that the plate may be slid to cover a portion of the finder lens, so that the view to be photographed may be properly positioned with respect to the portion of the film which is exposed.

The plate shown in Fig. 6, is adapted for reducing the width of the finder opening and consists of a substantially U-shaped plate 38, having one side wider than the other and a lug 39 struck up therefrom, by means of which the plate is moved so that the wider portion will cover one side of the finder.

A strap 40 is connected with the end 7, to provide a handle for carrying the camera. Flat springs 41 serve to keep the film from bulging.

It will be seen from the foregoing that when it is desired to take an exposure on a lesser portion of the film exposed, the handle 24 is manipulated to swing the shutter 21, to a position parallel with the film, so as to cut-off the light from that portion of the film. The cover plate on the finder to be used is then adjusted so as to cover a portion of the lens, thus enabling the camera to be adjusted so the view to be photographed will be centered with respect to the negative.

It is to be understood that the form of my invention herewith shown and described is to be taken as a preferred example of the same and that certain changes in the shape, size and arrangement of the parts may be made without departing from the spirit of the invention or the scope of the subjoined claims.

Having thus described my invention, I claim:—

1. A finder for multiple exposure cameras comprising a cover plate slidably mounted over the finder opening and formed in a manner to enable the selective positioning thereof with respect to the opening so as to reduce the opening corresponding to the portion of film under exposure and gripping means formed on the plate for moving the same into its selected position.

2. A finder for multiple exposure cameras comprising a cover plate slidably mounted over the finder opening, said plate having a cut-out section permitting the sighting of an object through a predetermined portion of the finder opening corresponding to a predetermined reduced portion of the film under exposure and a laterally extending projection formed on the plate providing gripping means for moving the plate into and out of finding position.

In testimony whereof I affix my signature.

HENRY CLAY TEUTON.